United States Patent [19]
Min

[11] Patent Number: 6,061,350
[45] Date of Patent: May 9, 2000

[54] ADDRESS DETECTING DEVICE OF ETHERNET CONTROLLER AND ADDRESS DETECTING METHOD THEREOF

[75] Inventor: Kyung Pa Min, Seoul, Rep. of Korea

[73] Assignee: LG Semicon Co., Ltd., Chungcheongbuk-do, Rep. of Korea

[21] Appl. No.: 08/949,703

[22] Filed: Oct. 14, 1997

[30] Foreign Application Priority Data

Jul. 9, 1997 [KR] Rep. of Korea .............. 97-31841

[51] Int. Cl.[7] ............................................. H04L 12/28
[52] U.S. Cl. ............................................. 370/389
[58] Field of Search .................. 370/389, 390, 370/432, 445, 447, 910, 401; 364/242.94; 709/220, 250; 711/104, 108; 371/67.1; 714/819

[56] References Cited

U.S. PATENT DOCUMENTS

| | | | |
|---|---|---|---|
| 4,931,993 | 6/1990 | Urushima | 365/189.07 |
| 5,095,480 | 3/1992 | Fenner | 370/238 |
| 5,305,321 | 4/1994 | Crayford | 370/389 |
| 5,327,534 | 7/1994 | Hutchison et al. | 709/226 |
| 5,459,743 | 10/1995 | Fukuda et al. | 370/399 |
| 5,461,634 | 10/1995 | McGrath et al. | 714/719 |
| 5,537,623 | 7/1996 | Chamberlain et al. | 709/220 |
| 5,854,786 | 12/1998 | Henderson et al. | 370/335 |

*Primary Examiner*—Ajit Patel
*Assistant Examiner*—Mitchell Slavitt

[57] ABSTRACT

Disclosed are an address detecting device of an ethernet controller and an address detecting method thereof which improve processing ability of a packet by prompt comparison between a destination address and a group address. The address detecting method of an ethernet controller includes the steps of detecting whether a predetermined byte destination address for a transmission packet has been stored in an MAC, outputting the stored destination address if so, comparing the destination address input from the MAC with a predetermined group address, outputting a hit signal which is indicative of coincidence to the MAC if the destination address is coincident with the group address, comparing the remaining byte destination address except for the predetermined byte destination address with the remaining byte group address except for the predetermined byte group address in response to the hit signal, and receiving the packet if the remaining byte destination address is coincident with the remaining byte group address.

21 Claims, 9 Drawing Sheets

FIG.4
conventional art

```
SetupMCHashBit ( si -> Multicast Table, cx = No of entries in Table)
    [MCAddress+0] = es:[si];
    [MCAddress+2] = es:[si+2];
    [MCAddress+4] = es:[si+4];
    CRC = 0ffffffffh;
    PLYNOMIAL = 1DB604C1h = 11101011011000000100110000001
    for(index = 0 ; index < 6; ++index) {
        for (j = 0 ; j < 8 ; ++j) {
            carry = ((crc & 0x80000000 ? 1 : 0)^(MultiCastAddress [j] & 01));
            crc <<=1;
            MultiCastAddress [j] >>= 1;
            if (carry)
                crc = ( (crc^PLYNOMIAL) | Carry)
        }
    }
    crc = crc & 0x0ff000000h;
    crc = crc >> 26;
}
```

```
 15 14                              7 6 5 4 3 2 1 0
CRC
CRC[2:0]  -> Bit NO. to be set
CRC[5:3]  -> Select 1byte of 8byte
```

< Multicast table >

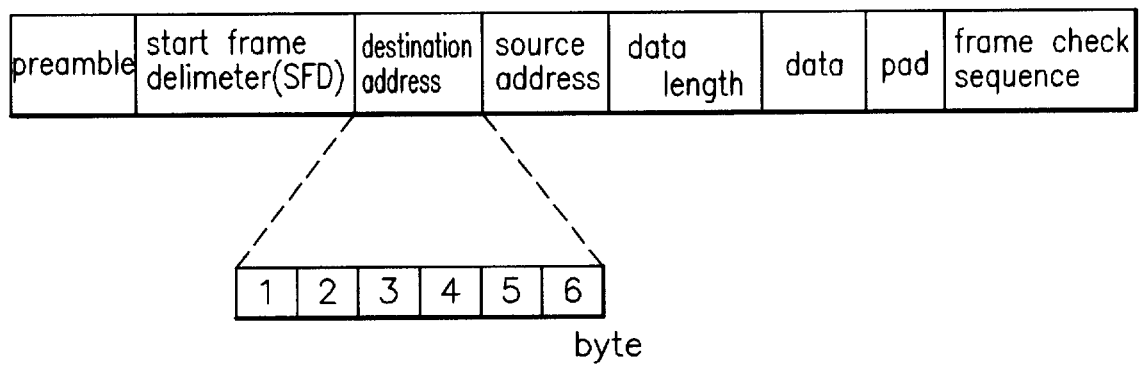

FIG.11

| A B A B | C D C D | 4 4 4 4 |
| 3 4 5 6 | 7 8 9 A | C D E F |
| 7 7 7 7 | 4 3 2 1 | 7 7 7 7 |
| 3 4 5 6 | | |
| ⋮ | ⋮ | ⋮ |

ADDRESS DETECTING DEVICE OF ETHERNET CONTROLLER AND ADDRESS DETECTING METHOD THEREOF

BACKGROUND OF THE INVENTION

1. Field of the Invention

The present invention relates to an ethernet protocol, and more particularly, to an address detecting device of an ethernet controller and an address detecting method thereof suitable for detection of a packet address input from network interface card (NIC) connected to local area network (LAN).

2. Discussion of the Related Art

Generally, the use of local area network (LAN) for interconnecting data terminal equipments (DTEs), such as computers, word processors or the like, is well-known. In the LAN, each of devices has its inherent address and a plurality of group addresses. A network interface card is mounted in each one of the DTEs and couples each one of the DTEs to a transmission media. Each of the DTEs compares an address transmitted to the network interface card with a group address as well as its inherent address. As a result, each of the DTEs receives data or does not receive data. The data transmission and reception between each of the DTEs on the network are performed in packet units.

Therefore, each of the DTEs detects a destination address of data input in packet units. The DTE receives a current transmission packet if the detected destination address corresponds to its destination address. While the DTE does not receive a current transmission packet if the destination address does not correspond.

A conventional address detecting device of an ethernet controller will be described with reference to FIG. 1.

FIG. 1 is a schematic block of a conventional address detecting device of an ethernet controller.

As illustrated in FIG. 1, the conventional address detecting device includes a system bus interface 13, a media access controller (MAC) 15, and an attachment module 17.

The system bus interface 13 is connected to a system bus 11. The attachment module 17 receives packet data from each of the network. The attachment module 17 which is called a front end module performs modulation and demodulation functions for receiving data from the network and transmitting data to the network.

As illustrated in FIG. 2, the MAC 15 includes an SRAM 15a, a first-in first-out (FIFO) memory 15b, and a comparator 15c.

The comparator 15c is connected to the SRAM 15a and the FIFO memory 15b. The SRAM 15a stores a plurality of group addresses. The FIFO memory 15b receives a destination address of transmission data in packet unit and outputs it to the comparator 15c. The comparator 15c compares the group address stored in the SRAM 15a with the destination address output from the FIFO memory 15b.

The system bus interface 13 is disposed between the system bus 11 and the MAC 15.

A conventional address detecting method of the aforementioned conventional address detecting device of the ethernet controller will be described below.

As illustrated in FIG. 1 and FIG. 2, the destination address is input to the FIFO memory 15b of the MAC 15 and output to the comparator 15c.

At this time, a plurality of group addresses are stored in the SRAM 15a. The comparator 15c compares the group addresses stored in the SRAM 15a with the address output from the FIFO memory 15b. As a result, if the addresses stored in the SRAM 15a are coincident with the address output from the FIFO memory 15b, a hit signal which is indicative of the coincidence is output by the comparator. If not, the data stored in the FIFO memory 15b and the SRAM 15a are reset.

In the address detecting method according to the address detecting device of FIG. 1, the address detecting block is disposed within the MAC 15.

Another conventional address detecting device in which the address detecting block is disposed outside from the MAC 15 will now be described.

As illustrated in FIG. 3, another conventional address detecting device includes a system bus interface 13, an MAC 15, an attachment module 17, and an address detector 19.

The address detector 19 is connected to the MAC 15 and the attachment module 17, respectively.

The system bus interface 13 is disposed between the system bus 11 and the MAC 15.

The address detector 19 compares the group address stored in the MAC 15 with the destination address output from the attachment module 17 to detect whether these addresses are coincident with each other. In the MAC 15, the SRAM (not shown) is mounted to store the group address.

In the aforementioned conventional address detecting device, the address detecting block disposed outside of the MAC 15 compares the group address stored in the MAC 15 with the address output from the attachment module 17 and transmits the comparative result to the MAC 15.

A conventional address detecting method according to a software hash method will now be described.

The software hash method performs a polynomial CRC algorithm. An 8 byte multicast table is prepared based on the result of such a CRC algorithm.

FIG. 4 shows the CRC algorithm.

As illustrated in FIG. 4, a bit is set in a position of multicast address register defined by the CRC algorithm. By doing so, the multicast table is prepared.

FIG. 5 shows the prepared multicast table.

If the packet is input to the address detecting block after preparing the multicast table, the CRC algorithm for the packet is performed. It is then determined whether a bit is set in a corresponding position referring to the multicast table by the result of such algorithm. If so, the address detecting device receives the packet. If not, the address detecting device does not receive the packet.

The conventional address detecting device of the ethernet controller and the conventional address detecting method thereof have several problems.

First, since the software hash method has an extremely low speed, and the processing ability of the packet is remarkably reduced.

In addition, the method for detecting the address within the MAC requires many storage regions to store all of group addresses. It also reduces processing ability of the packet because all group addresses are compared until the addresses are coincident whenever the packet is received.

SUMMARY OF THE INVENTION

Accordingly, the present invention is directed to an address detecting device of an ethernet controller and an address detecting method thereof that substantially obviates one or more of the problems due to limitations and disadvantages of the related art.

An object of the present invention is to provide an address detecting device of an ethernet controller and an address detecting method thereof which improve processing ability of a packet by prompt comparison in such a manner that a plurality of addresses of significant bit are primarily compared.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in a packet transmission between devices having a plurality of group addresses on a network, an address detecting device of an ethernet controller according to the present invention includes a memory for storing a plurality of the group addresses, a preliminary address comparator for primarily comparing the group addresses stored in the memory with a destination address of the packet and outputting the resulting value, and an MAC for storing the destination address of the packet input through a system bus and secondarily comparing the destination address with the group addresses by the resulting value output from the preliminary address comparator.

In another aspect, an address detecting method of an ethernet controller according to the present invention includes the steps of detecting whether a predetermined byte destination address for a transmission packet has been stored in an MAC, outputting the stored destination address if so, comparing the destination address input from the MAC with a predetermined group address, outputting a hit signal which is indicative of coincidence to the MAC if the destination address is coincident with the group address, comparing the remaining byte destination address except for the predetermined byte destination address with the remaining byte group address except for the predetermined byte group address in response to the hit signal, and receiving the packet if the remaining byte destination address is coincident with the remaining byte group address.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 shows CRC algorithm according to a conventional address detecting method of an ethernet controller;

FIG. 9 shows an example of an ethernet packet;

FIG. 10 shows address stored in a second memory of a preliminary address comparator according to the present invention;

FIG. 11 shows address stored in an internal cam within MAC;

DETAILED DESCRIPTION OF THE PREFERRED EMBODIMENTS

Reference will now be made in detail to the preferred embodiments of the present invention, examples of which are illustrated in the accompanying drawings.

Figure 1:
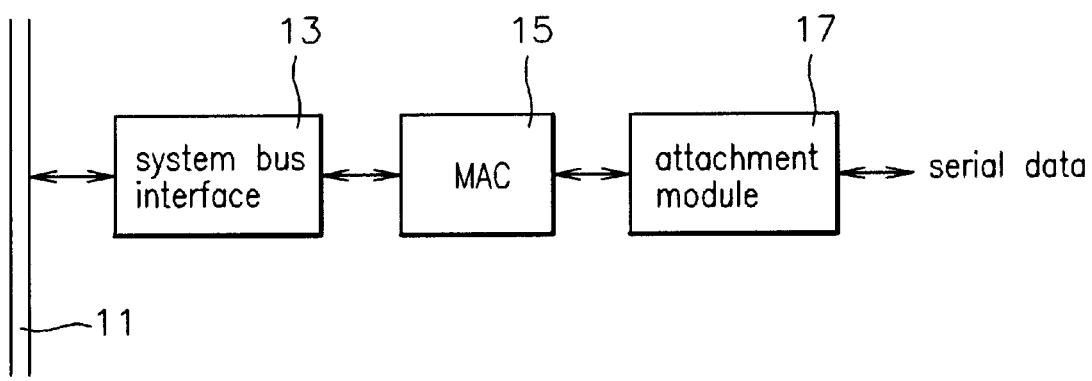
FIG. 1 is a schematic block of a conventional address detecting device of an ethernet controller.
Figure 2:
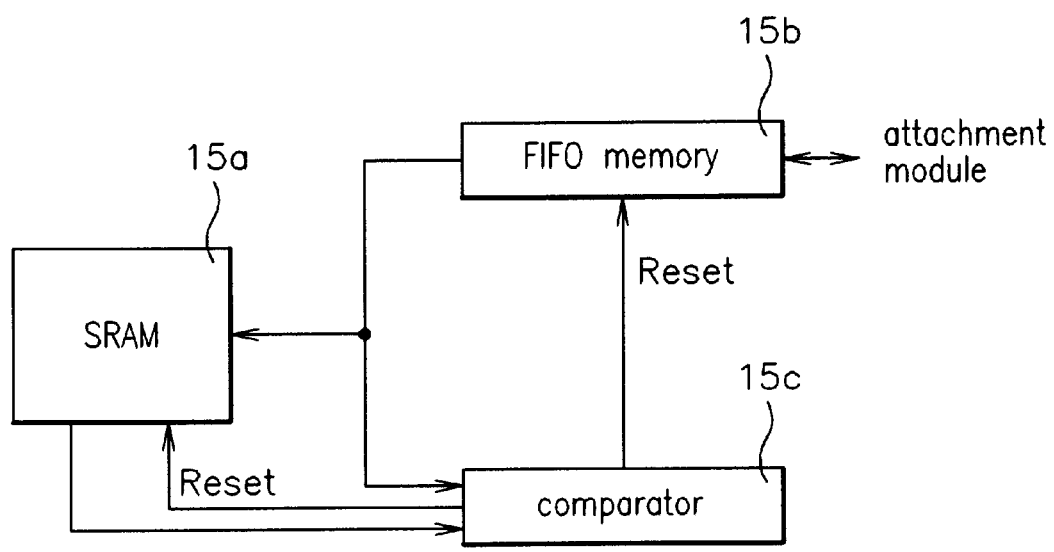
FIG. 2 is a partial detailed view of FIG. 1.
Figure 3:
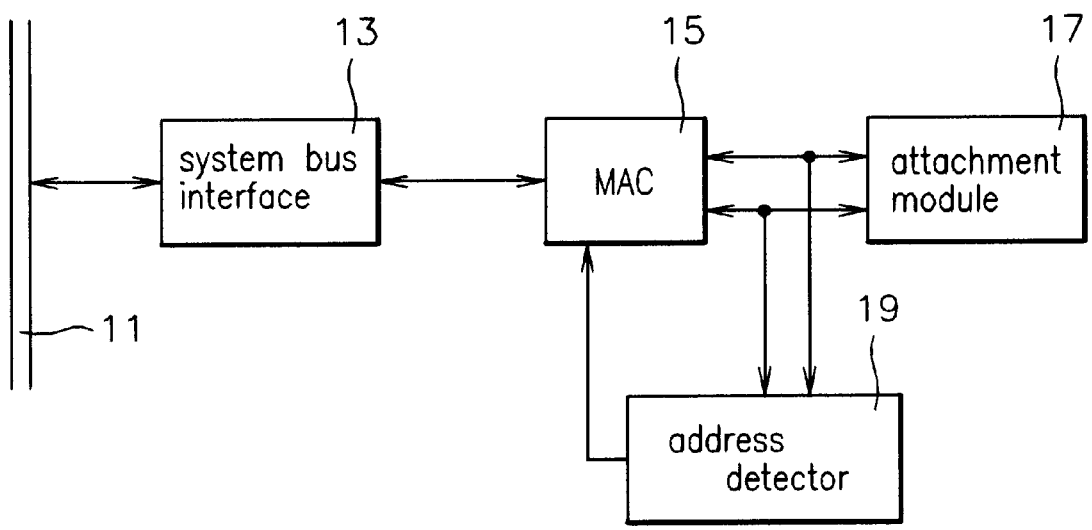
FIG. 3 is a schematic block of another conventional address detecting device of an ethernet controller.
Figure 5:
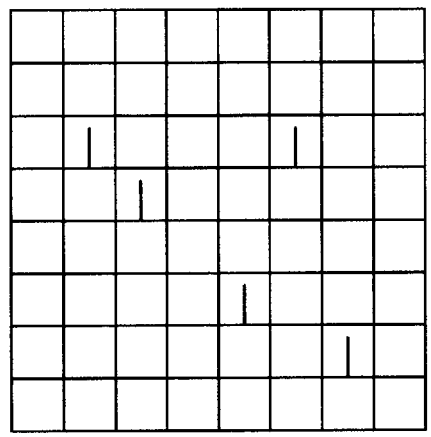
FIG. 5 shows a multicast table according to a conventional address detecting method of FIG. 4.
Figure 6:
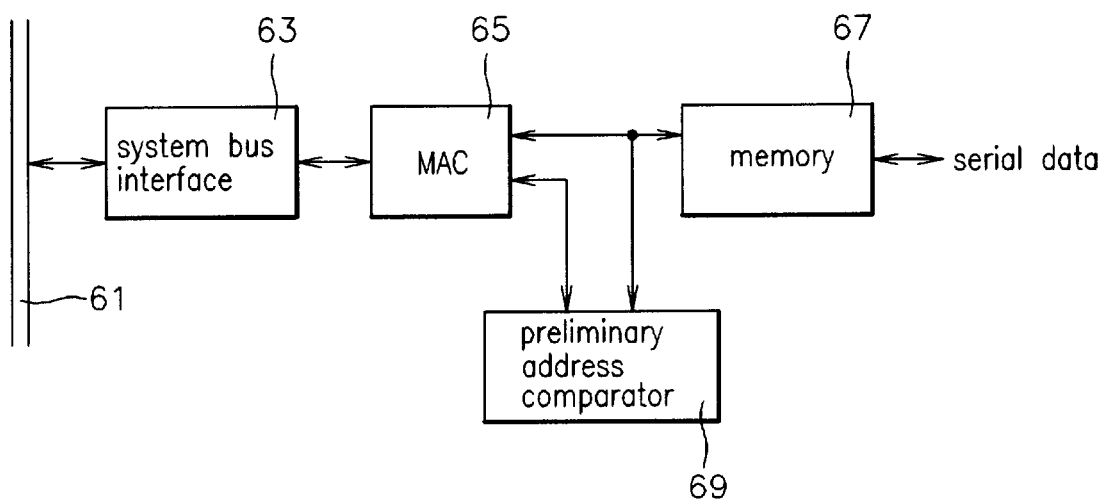
FIG. 6 is a schematic block of an address detecting equipment of an ethernet controller according to the present invention.

As illustrated in FIG. 6, an address detecting device of an ethernet controller according to the present invention includes a system bus interface 63, an MAC 65, a memory 67, and a preliminary address comparator 69.

The system bus interface 63 is disposed between a system bus 61 and the MAC 65.

The memory 67 connected to the MAC 65 and the preliminary address comparator 69 is a FIFO memory.

The MAC 65 is connected to the system bus interface 63, the memory 67, and the preliminary address comparator 69.

Figure 7:
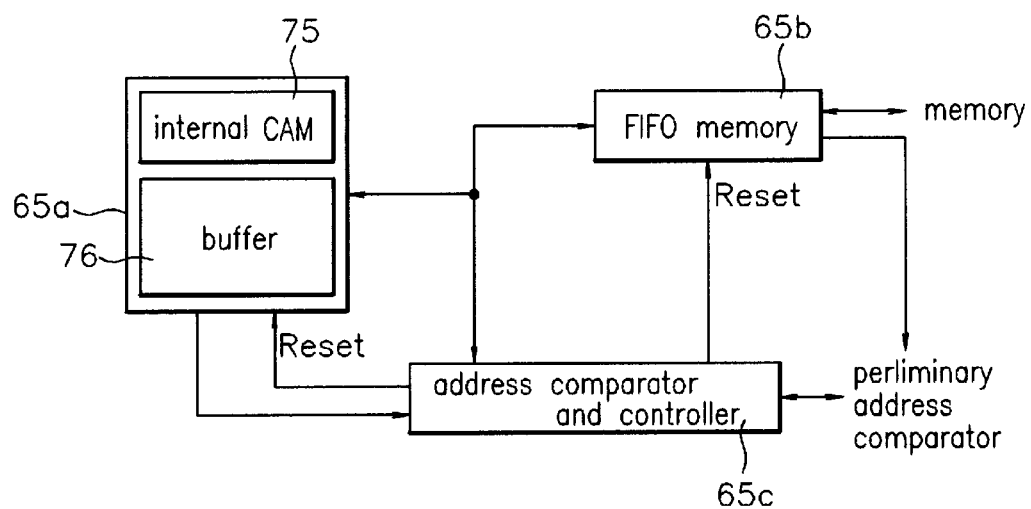
FIG. 7 is a detailed schematic block of MAC according to the present invention.

As illustrated in FIG. 7, the MAC includes an SRAM 65*a*, a FIFO memory 65*b*, and an address comparator and controller 65*c*.

The FIFO memory 65*b* disposed within the MAC 65 is connected to the system bus 61 through the system bus interface 63 and inputs a destination address of a packet.

The destination address includes 6 bytes. If a 4 byte portion of the 6 byte destination address is input to the FIFO memory 65*b*, the FIFO memory 65*b* outputs the 4 byte address together with a preliminary address loading signal to the preliminary address comparator 69.

The preliminary address comparator 69 will now be described in detail with reference to FIG. 8.

Figure 8:
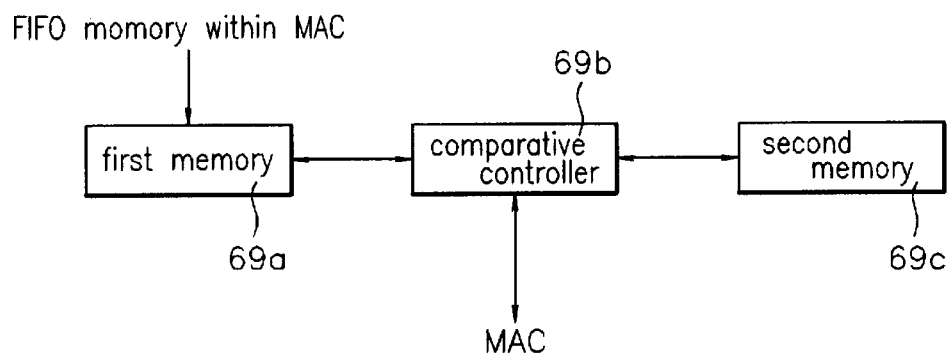
FIG. 8 is a detailed schematic block of a preliminary address comparator according to the present invention.

As illustrated in FIG. 8, the preliminary address comparator 69 includes a first memory 69*a*, a comparative controller 69*b*, and a second memory 69*c*.

The first memory 69*a* is connected to the FIFO memory 65*b* disposed within the MAC 65. The comparative controller 69*b* is connected to the first memory 69*a* and the second memory 69*c*.

If the 4 byte destination address of the 6 byte destination address is stored in the FIFO memory 65*b*, the FIFO memory 65*b* outputs it to the first memory 69*a*. Thus, the first memory 69*a* stores 4 byte destination address.

The second memory 69*c* is connected to the comparative controller 69*b* and stores a group address which will be compared with 4 byte destination address stored in the first memory 69*a*. At this time, the group address is 4 byte.

The remaining 2 byte portion of the group address, corresponding to the 4 byte group address stored in the second memory 69*c* is stored in the SRAM 65*a* of the MAC 65.

The second memory 69c stores the 4 byte group address which will be compared with the 4 byte destination address stored in the first memory 69a. The second memory 69c also stores the number of 4 byte group addresses and a start address of the SRAM 65a having the remaining 2 byte group address.

The comparative controller 69b compares the 4 byte destination address stored in the first memory 69a with the 4 byte group address stored in the second memory 69c. As a result, if the destination address is coincident with the group address, the comparative controller 69b outputs a hit signal which is indicative of the coincidence to the MAC 65.

The SRAM 65a disposed within the MAC 65 is divided into an internal contents address memory (CAM) 75 and an input/output buffer 76. The internal CAM 75 serially stores a 2 byte address corresponding to the two least significant bytes of the 6 byte destination address.

An address detecting method of an ethernet controller according to the present invention will be described below.

FIG. 9 shows an exemplary ethernet packet.

A packet includes 7 byte preamble, a start frame delimiter (SFD), a destination address, a source address, information for data length, data, a pad, and a frame check sequence (FCS) for error check.

In the address detecting method according to the present invention, as illustrated in FIG. 9, 4 byte destination address corresponding to the most significant bytes of the 6 byte destination address is primarily compared with the group address by the preliminary address comparator 69. The remaining 2 byte destination address is compared with the group address within the MAC 65.

The address detecting method according to the present invention will be described in detail with reference to FIG. 6 and FIG. 7.

As illustrated in FIG. 6 and FIG. 7, if the packet from the network is transmitted to the MAC 65, the MAC 65 detects the SFD. The FIFO memory 65b of the MAC 65 stores 4 byte destination address through the system bus interface 63.

When the 4 byte destination address is stored in the FIFO memory 65b, the FIFO memory 65b outputs the 4 byte destination address and a preliminary address loading signal to the first memory 69a of the preliminary address comparator 69.

At this time, the memory 67 shown in FIG. 6 stores the 4 byte group address which will be compared with 4 byte destination address.

Subsequently, as illustrated in FIG. 7, the first memory 69a of the preliminary address comparator 69 stores 4 byte destination address transmitted from the FIFO memory 65b of the MAC 65. The second memory 69c stores the 4 byte group address.

The comparative controller 69b compares the destination address with the group address. As a result, if the destination address and the group address are coincident with each other, the comparative controller 69b outputs a hit signal to the MAC 65.

The operation of the preliminary address comparator 69 will be described in detail with reference to FIG. 10.

FIG. 10 shows the second memory of the preliminary address comparator.

Supposing that 6 byte group addresses of the second memory are ABABABAB3456, ABABABAB789A, ABABABABCDEF, 333333337777, 333333334321, 27272727ABAB, 27272727CDCD, 272727274444, 343434347777, and 343434343456. The address 27272727 corresponds to the 4 (most significant) bytes group address and is stored in the first address of the second memory 69c.

The first address of the internal CAM in the MAC, having the remaining 2 (least significant) byte address and the number of the group addresses beginning with 27272727 are stored in the second address of the second memory 69c. At this time, it is noted that the number of the group addresses beginning with 27272727 is three.

Subsequently, the address ABABABAB of the group addresses is stored in the third address of the second memory 69c. The first address of the internal CAM in the MAC, having the remaining 2 byte address except for 4 byte address corresponding to significant bit of the group addresses beginning at ABABABAB, and the number of the group addresses beginning at ABABABAB are stored in the fourth address of the second memory 69c. It is noted that the number of the group addresses beginning at ABABABAB is three.

In the same manner, so are the group addresses beginning at 33333333 and 34343434 stored.

Meanwhile, FIG. 11 shows the address which is stored in the internal CAM of the MAC.

As illustrated in FIG. 11, the internal CAM 75 serially stores the remaining 2 byte group address beginning at 27272727. Then, the internal CAM 75 serially stores the remaining 2 byte group addresses beginning at ABABABAB, 33333333, and 34343434.

In other words, the addresses ABAB, CDCD, and 4444 correspond to 2 byte address preceded by 27272727 of the group addresses. The addresses 3456, 789A, and CDEF correspond to 2 byte address preceded by ABABABAB of the group addresses.

Likewise, the addresses 7777 and 4321 correspond to 2 byte address preceded by 33333333 and the addresses 7777 and 3456 correspond to 2 byte address preceded by 34343434.

Consequently, the preliminary address comparator 69 primarily compares the address from the first memory 69a with the address from the second memory 69c. As a result, if the address from the first memory 69a and the address from the second memory 69c are coincident with each other, the preliminary address comparator 69 outputs a hit signal which is indicative of the coincidence to the MAC 65.

When the bit signal is output, the address comparator and controller 65c of the MAC 65 secondarily compares the remaining 2 byte address of the group address stored in the internal CAM 75 with 2 byte address loaded from the preliminary address comparator 69. As a result, if they are coincident with each other, the MAC 65 receives the current transmission packet. If not, the MAC 65 does not receive the current transmission packet.

Figure 12:
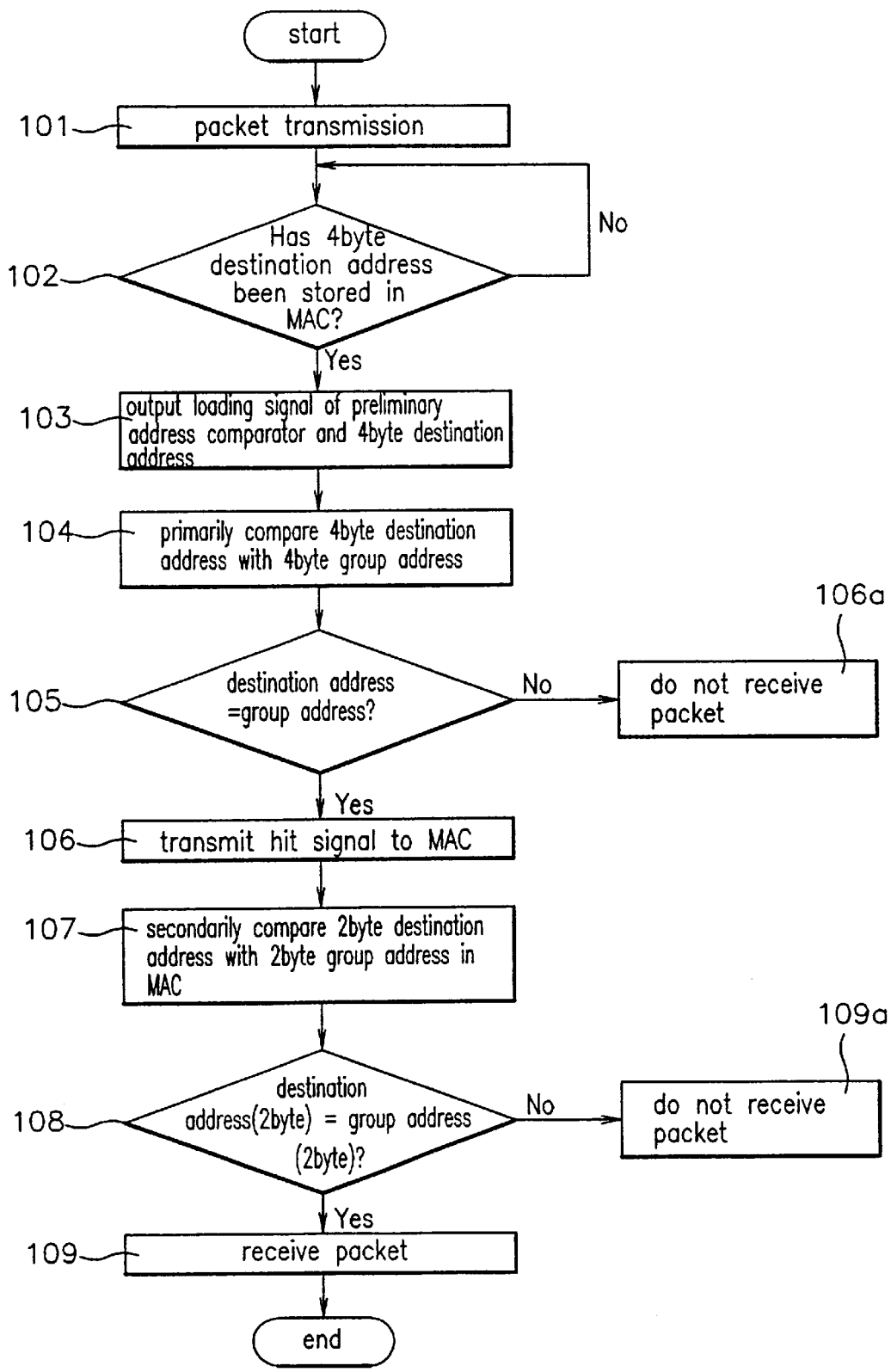
FIG. 12 is a flow chart illustrating an address detecting method of an ethernet controller according to the present invention.

FIG. 12 is a flow chart illustrating the address detecting method of an ethernet controller according to the present invention.

As illustrated in FIG. 12, in the address detecting method according to the present invention, if the packet transmission is performed (101), the start frame delimiter (SFD) is detected and 4 byte destination address is stored.

It is then determined whether 4 byte destination address of the destination address has been stored in the FIFO memory of the MAC (102). If so, the MAC outputs a preliminary address loading signal and 4 byte destination address to the preliminary address comparator (103).

The preliminary address comparator primarily compares 4 byte destination address stored in the first memory with 4 byte group address stored in the second memory (104).

It is determined whether the destination address and the group address are coincident with each other (105). If so, the preliminary address comparator outputs a hit signal to the MAC (106). If not, the preliminary address comparator does not receive packet (106a).

The MAC which received the hit signal from the preliminary address comparator secondarily compares the remaining 2 byte address of the group address stored in the SRAM with the remaining 2 byte address of the destination address (107).

It is determined whether 2 byte destination address and 2 byte group address are coincident with each other (108). If so, the MAC finally receives transmission packet (109). If not, the MAC does not receive transmission packet (109a).

As aforementioned, to determine whether to receive the transmission packet or not to receive the transmission packet, the destination address and the group address are primarily compared with each other outside from the MAC and secondarily compared with each other within the MAC.

Figure 13:
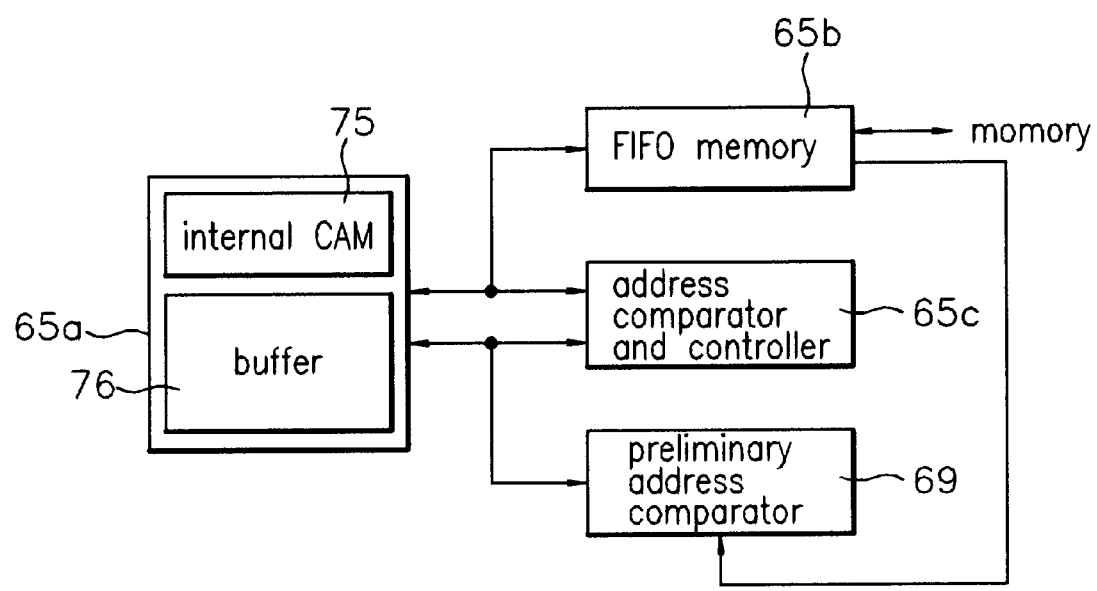
FIG. 13 is a schematic block of another address detecting device of an ethernet controller according to the present invention.

FIG. 13 is a schematic block of another address detecting device of an ethernet controller according to the present invention.

As illustrated in FIG. 13, the preliminary address comparator 69 is disposed within the MAC 65 to compare the destination address with the group address only within the MAC.

As aforementioned, the address detecting device of the ethernet controller and the address detecting method thereof according to the present invention have the following advantages.

First, since the destination address and the group address are primarily compared with each other by the preliminary address comparator, it is possible to promptly determine whether or not to receive the packet.

Second, since only 2 byte address is compared within the MAC, it is possible to promptly determine whether or not to receive the packet.

Finally, since overall 6 byte addresses are separately stored in the MAC and the preliminary address comparator, it is possible to easily process the packet even if the number of the group addresses increases.

It will be apparent in the art that various modifications and variations can be made in the address detecting device of the ethernet controller and the address detecting method thereof according to the present invention without departing from the spirit or scope of the invention. Thus, it is intended that the present invention cover the modifications and variations of the invention provided they come within the scope of the appended claims and their equivalents.

What is claimed is:

1. In a packet transmission between devices having a plurality of group addresses on a network, an address detecting device of an ethernet controller comprising:
    a memory for storing a plurality of the group addresses;
    a preliminary address comparator for primarily comparing the group addresses stored in the memory with a destination address of a packet and outputting a resulting value; and
    an a controller for storing the destination address of the packet input through a system bus and secondarily comparing the destination address with the group addresses based on the resulting value output from the preliminary address comparator.

2. The address detecting device of an ethernet controller as claimed in claim 1, further comprising a system bus interface between the system bus and the controller.

3. The address detecting device of an ethernet controller as claimed in claim 1, wherein the memory is a FIFO memory.

4. The address detecting device of an ethernet controller as claimed in claim 1, wherein the controller includes an SRAM, a FIFO memory, and an address comparator and controller.

5. The address detecting device of an ethernet controller as claimed in claim 1, wherein the preliminary address comparator includes a first memory for storing the destination address, a second memory for storing the group addresses, and a comparative controller for comparing the addresses stored in the first and second memories with each other and outputting the resulting value.

6. In a packet transmission between devices having a plurality of N byte group addresses on a network, an address detecting device of an ethernet controller comprising:
    a memory for storing an M byte group address of a plurality of the N byte group addresses;
    a preliminary address comparator for primarily comparing the M byte group addresses stored in the memory with an M byte destination address of an N byte destination address of a packet and outputting a resulting value; and
    a controller for secondarily comparing a remaining N–M byte destination address with a remaining N–M byte group address based on the resulting value output from the preliminary address comparator.

7. The address detecting device of an ethernet controller as claimed in claim 6, wherein the memory is a FIFO memory.

8. The address detecting device of an ethernet controller as claimed in claim 6, wherein the controller MAC includes an SRAM, a FIFO memory, and an address comparator and controller.

9. The address detecting device of an ethernet controller as claimed in claim 6, wherein the preliminary address comparator is mounted within the controller.

10. The address detecting device of an ethernet controller as claimed in claim 8, wherein the SRAM includes an internal CAM which stores the remaining N–M byte group address which is not compared by the preliminary address comparator.

11. The address detecting device of an ethernet controller as claimed in claim 8, wherein the FIFO memory stores the M byte destination address of the N byte destination address of the packet.

12. The address detecting device of an ethernet controller as claimed in claim 6, wherein the preliminary address comparator includes a first memory for storing the M byte destination address from the FIFO memory within the controller, a second memory for storing the M byte group address to be compared with the M byte destination address of the first memory, and a comparative controller for comparing the M byte addresses stored in the first and second memories with each other and outputting the resulting value.

13. The address detecting device of an ethernet controller as claimed in claim 12, wherein the second memory stores a start address of the internal CAM which stores the remaining N–M byte group addresses, together with a number of the remaining N–M byte group addresses.

14. An address detecting method of an ethernet controller comprising the steps of:
    detecting whether a predetermined byte destination address for a transmission packet has been stored in an controller;
    outputting the stored destination address if so;

comparing the destination address input from the MAC with a predetermined group address;

outputting a hit signal which is indicative of coincidence to the controller if the destination address is coincident with the group address;

comparing the remaining byte destination address except for the predetermined byte destination address with the remaining byte group address except for the predetermined byte group address in response to the hit signal; and receiving the packet if the remaining byte destination address is coincident with the remaining byte group address.

15. The address detecting method of an ethernet controller as claimed in claim 14, wherein the destination address and the group address are 6 byte address and the predetermined byte destination address stored in the controller is 4 byte address.

16. The address detecting method of an ethernet controller as claimed in claim 14, wherein the group address which is compared with the destination address input from the controller is 4 byte address.

17. A method, comprising:

receiving an N byte destination address;

determining whether M bytes of the N byte destination address match M bytes of an N byte group address;

deciding whether N–M bytes of the N byte destination address match N–M bytes of an N byte group address if the determining step determines that the M bytes of the N byte destination address match the M bytes of the N byte group address; and receiving a data packet associated with the N byte destination address if the deciding step decides that the N–M bytes of the N byte destination address match the N–M bytes of an N byte group address.

18. The method of claim 17, wherein the M bytes of the M bytes of the N byte destination address are more significant bytes than the N–M bytes of the N byte destination address, and the M bytes of the N byte group address are more significant bytes than the N–M bytes of the N byte group address.

19. The method of claim 17, wherein N equals 6 and M equals 4.

20. The method of claim 17, further comprising:

not receiving the data packet if the determining step determines that the M bytes of the N byte destination address do not match the M bytes of the N byte group address.

21. The method of claim 20, further comprising:

not receiving the data packet if the deciding step decides that the N–M bytes of the N byte destination address do not match the N–M bytes of the N byte group address.

* * * * *